US008525824B2

(12) United States Patent
Okamura et al.

(10) Patent No.: US 8,525,824 B2
(45) **Date of Patent: *Sep. 3, 2013**

(54) LIQUID CRYSTAL DISPLAY DRIVER DEVICE AND LIQUID CRYSTAL DISPLAY SYSTEM

(75) Inventors: Kazuhiro Okamura, Kokubunji (JP); Akihiko Yoshioka, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 401 days.

This patent is subject to a terminal disclaimer.

(21) Appl. No.: 12/707,710

(22) Filed: Feb. 18, 2010

(65) Prior Publication Data

US 2010/0149173 A1 Jun. 17, 2010

Related U.S. Application Data

(63) Continuation of application No. 11/123,153, filed on May 6, 2005, now Pat. No. 7,683,873.

(30) Foreign Application Priority Data

May 27, 2004 (JP) ................................ 2004-157005

(51) Int. Cl.
*G06F 3/038* (2013.01)
*G09G 5/00* (2006.01)

(52) U.S. Cl.
USPC ............... 345/214; 345/98; 345/99; 345/100; 345/103; 345/204

(58) Field of Classification Search
USPC .................. 345/156, 98–100, 103, 204, 214, 345/173–183
See application file for complete search history.

(56) References Cited

U.S. PATENT DOCUMENTS

| | | | |
|---|---|---|---|
| 5,365,284 | A | 11/1994 | Matsumoto et al. |
| 5,801,674 | A | 9/1998 | Shimizu |

(Continued)

FOREIGN PATENT DOCUMENTS

| | | | |
|---|---|---|---|
| JP | 7-239675 | A | 9/1995 |
| JP | H10-153986 | A | 6/1998 |

(Continued)

OTHER PUBLICATIONS

Office Action dated Nov. 27, 2012 in Taiwanese Patent Application 094111173.

(Continued)

*Primary Examiner* — Lun-Yi Lao
*Assistant Examiner* — Insa Sadio
(74) *Attorney, Agent, or Firm* — Miles & Stockbridge P.C.

(57) ABSTRACT

There is provided a display driver device (liquid crystal driver) causing no degradation in display image quality even when a plurality of signal lines (source lines) of a display panel are divided into a plurality of groups as a countermeasure against EMI. With a liquid crystal display driver device (the liquid crystal driver) for generating image signals to be impressed to respective signal lines of a display panel upon receiving display image data, and outputting the image signals in a lump, corresponding to every one line, according to an output timing signal inputted from outside, output amplifiers, in the last stage of the liquid crystal driver, for outputting the image signals, respectively, are divided into a plurality of groups, and the output amplifiers of respective groups are caused to undergo a periodical change in output sequence while the respective image signals are slightly staggered in output timing by the group.

7 Claims, 11 Drawing Sheets

(56) References Cited

U.S. PATENT DOCUMENTS

| | | | | |
|---|---|---|---|---|
| 5,990,630 | A | 11/1999 | Nakamura | |
| 6,049,321 | A | 4/2000 | Sasaki | |
| 6,323,836 | B1 | 11/2001 | Shin | |
| 6,424,328 | B1 | 7/2002 | Ino et al. | |
| 6,529,177 | B2 | 3/2003 | Nakamura | |
| 6,606,080 | B2 | 8/2003 | Mukao | |
| 6,831,621 | B2 | 12/2004 | Nakano | |
| 6,924,786 | B2 | 8/2005 | Hebiguchi | |
| 6,977,635 | B2 | 12/2005 | Ogawa et al. | |
| 7,015,886 | B2 | 3/2006 | Matsuyama | |
| 7,091,937 | B2 | 8/2006 | Nakamura | |
| 7,224,353 | B2 | 5/2007 | Song et al. | |
| 7,253,810 | B2 | 8/2007 | Ito et al. | |
| 7,259,738 | B2 | 8/2007 | Zhang et al. | |
| 7,262,757 | B2 | 8/2007 | Morita et al. | |
| 7,301,520 | B2 | 11/2007 | Koyama et al. | |
| 7,333,096 | B2 | 2/2008 | Washio et al. | |
| 2003/0034947 | A1 | 2/2003 | Tanaka et al. | |
| 2003/0169244 | A1 * | 9/2003 | Kurokawa et al. | 345/204 |
| 2004/0100435 | A1 * | 5/2004 | Baek et al. | 345/98 |

FOREIGN PATENT DOCUMENTS

| | | | |
|---|---|---|---|
| JP | 2950270 | A | 9/1999 |
| JP | 2001-242839 | A | 9/2001 |
| JP | 2001-272948 | A | 10/2001 |
| JP | 2003-076338 | A | 3/2003 |
| JP | 2003-233358 | | 8/2003 |
| JP | 2003-280613 | A | 10/2003 |
| TW | 558700 | B | 10/2003 |

OTHER PUBLICATIONS

Office Action issued Mar. 21, 2013, in Japanese Patent Application No. 2011-233632.

* cited by examiner

LIQUID CRYSTAL DISPLAY DRIVER DEVICE AND LIQUID CRYSTAL DISPLAY SYSTEM

CROSS-REFERENCE TO RELATED APPLICATION

This application is a continuation of application Ser. No. 11/123,153 filed May 6, 2005 now U.S. Pat. No. 7,683,873. The present application also claims priority from Japanese patent application No. 2004-157005 filed May 27, 2004, the content of which is hereby incorporated by reference into this application.

BACKGROUND OF THE INVENTION

The invention relates to a technology effective for application to a display driver device for driving a display panel, and a liquid crystal display driver device for driving a liquid crystal panel, and more particularly, to a technology effective for application to a liquid crystal driver (semiconductor integrated circuit for driving liquid crystals) for driving source lines of, for example, a TFT color liquid-crystal panel.

A liquid crystal display, as one of displays, is comprised of a liquid crystal display panel (hereinafter referred to also as a liquid crystal panel) as a display panel, a liquid crystal display controller (liquid crystal controller) as a display controller, a liquid crystal display driver device (liquid crystal driver) as a display driver, for driving the liquid crystal display panel under control by the controller, and so forth. There have thus far been proposed various types of the liquid crystal panels such as a passive type panel, an active-matrix type panel, and so forth.

Among those, a TFT liquid crystal panel, as one of the active-matrix type panels, has a construction in which a plurality of gate lines (scanning lines), and a plurality of source lines (signal lines) are disposed so as to intersect each other, an electrode serving as a pixel, and a transistor for applying a voltage to the electrode are disposed at respective crossover points, and liquid crystals are sandwiched between the respective electrodes, and a common opposite electrode. A source driver sequentially applies a pixel signal to the source lines of the liquid crystal panel, constructed as described, in sync with select actions of the respective gate lines line by line on a time-sharing basis.

As a source driver for driving a large screen TFT liquid crystal panel, use is made of a multi-output liquid crystal driver having a plurality of output terminals. The multi-output liquid crystal driver outputs a drive signal for the liquid crystal panel in sync with a line output signal inputted in order to give timing for impressing a voltage to the respective source lines. With the conventional multi-output liquid crystal driver, all the output terminals outputs the drive signal at the same timing, so that currents for driving the liquid crystal panel are converged, thereby causing a problem that a large current instantaneously flows, and the large current causes a spike-like noise to occur to a power source line and the signal lines, and a power source voltage to drop.

In general, as the radio wave environment becomes more complex, there arises the need for taking into account EMI (electromagnetic interference) of not only electronic equipment alone, but also a system made up of the same. With a liquid crystal display device using the conventional multi-output liquid crystal driver, since the source lines of the liquid crystal panel are concurrently driven, a large current instantaneously flows, and the large current causes a spike-like noise to occur to the power source line and the signal lines, thereby raising the risk of occurrence of EMI. It is necessary to prevent currents for driving the liquid crystal panel from being converged in order to reduce the EMI for one thing.

Accordingly, the inventor et al, have developed the invention relating to the source driver designed so as to deter occurrence of the EMI, wherein a plurality of source outputs are divided into two groups, for example, the right half and left half, to thereby avoid convergence of currents by staggering respective output timings as shown in FIG. 1, and have already submitted the application for the invention (Patent Document 1).

Patent Document 1: JP-A No. 233358/2003

SUMMARY OF THE INVENTION

With the prior invention, however, in the case of driving the source lines on a grouped unit basis, timing is staggered in such a way in which, for example, half the source lines on the left are driven after half the source lines on the right are driven, but drive sequence between the respective halves of the source lines has remained fixed.

The inventor et al, have since reviewed a method of driving the source lines, and have found out that if the drive sequence between the respective groups of the source lines remains the same, since the voltage impressed to the source lines is impressed to pixel electrodes through the intermediary of respective TFTs (thin-film transistors) that are turned ON or OFF by a signal of the respective gate lines, fall in voltage VG of the gate line causes the voltage of the respective source lines not to be impressed to the respective pixel electrodes although a sufficient effect is obtained as a countermeasure against EMI.

As a result, it has been found out that effective voltage of the half of the source lines, on the right side, is slightly misaligned form that of the half of the source lines, on the left side, that is, as shown in FIG. 15, difference occurs in hatched area, corresponding to charged electron quantity of the pixel electrode, between the left half source lines Y1 to Yn/2, respectively, and the right half source lines Yn/2+1 to Yn, respectively, thereby raising the risk of deterioration in display image quality of the liquid crystal panel It is therefore an object of the invention to provide a display driver device (liquid crystal driver, semiconductor integrated circuit for driving liquid crystals) excellent in display image quality.

Another object of the invention is to provide a display driver device (liquid crystal driver, semiconductor integrated circuit for driving liquid crystals) capable of executing drive for high-quality display while deterring occurrence of EMI.

Still another object of the invention is to provide a display driver device (liquid crystal driver, semiconductor integrated circuit for driving liquid crystals) having ease of operation.

The above and other objects, novel features of the invention will be apparent from the following detailed description of the present specification in conjunction with the accompanying drawings.

A representative one of embodiments disclosed in the applicant's invention is broadly described as follows.

That is, in a liquid crystal driver for generating image signals to be impressed to respective signal lines of a display panel upon receiving display image data, and outputting the image signals in a lump, corresponding to every one line, according to an output timing signal inputted from outside, output amplifiers, in the last stage of the liquid crystal driver, for outputting the image signals, respectively, are divided into a plurality of groups, and the output amplifiers of respective groups are caused to undergo a periodical change in output sequence while the respective image signals are slightly staggered in output timing by the group.

With adoption of means described as above, because the respective image signals are slightly staggered in output timing by the output amplifier of each of the groups, it is possible to prevent current from being converged to flow into the display panel, thereby reducing EMI. Further, since the output amplifiers of respective groups undergo the periodical change in output sequence, time in which the image signal is impressed to the respective pixel electrodes becomes equal on average, so that effective voltage becomes uniform, thereby avoiding degradation in display image quality. As a result, it is possible to obtain a display driver device (liquid crystal driver) that does not cause degradation in display image quality even in the case where a plurality of the signal lines (source lines) of the display panel are divided into the plurality of groups so as to be driven with time difference between the respective groups.

In this case, a switchover circuit for causing the output sequences of the output amplifiers of respective groups to undergo the periodical change is preferably provided, and a control signal for the switchover circuit is generated based on an AC conversion signal inputted from outside in order to provide a period for effecting AC drive of pixels of the liquid crystal panel, thereby varying the output sequences of the output amplifiers of respective groups according to a period of the AC conversion signal. As the AC conversion signal is a signal essential to liquid crystal drivers, it is possible through generation of the control signal for the switchover circuit, on the basis of the AC conversion signal, to obtain the liquid crystal driver capable of deterring occurrence of EMI by avoiding convergence of current without increasing the number of input signals, and the number of external terminals, and without largely changing a system configuration, and capable of executing drive for high-quality display.

Further, another embodiment disclosed in the applicant's invention is a liquid crystal display driver device (liquid crystal driver) for generating and outputting a plurality of image signals converted into respective analog gradation voltages upon receiving display image data, wherein output amplifiers, in the last stage of the liquid crystal driver, for outputting the image signals according to an output timing signal, respectively, are divided into a plurality of groups, the output amplifiers of respective groups are caused to undergo a periodical change in output sequence while the respective image signals are slightly staggered in output timing by the output amplifier of the respective groups, and a terminal for setting from outside so as to either effect or nullify such a function of output control with time difference as described is provided.

With some liquid crystal panels, sufficient charge time for the pixel electrodes cannot be obtained because a period of line output timing is short, and with such a liquid crystal panels, if the function of the output control with time difference is effected, this will rather raise the risk of causing degradation in display image quality. However, with adoption means described as above, it is possible to obtain the display driver device (liquid crystal driver) with ease of operation, capable of either implementing the function of the output control with time difference, or not implementing the same.

Now, in the case of dividing the output amplifiers in the last stage into two groups, on the right, and left sides, respectively, the switchover circuit for causing the output sequences of the output amplifiers of respective groups to undergo the periodical change is preferably disposed in the vicinity of the center of the line of the plurality of the output amplifiers, and wiring for transmitting the output timing signal to be fed from the switchover circuit to the respective output amplifiers is preferably installed along the direction of the lines of the output amplifiers.

As a method of dividing the output amplifiers into two groups, there are two methods, that is, a method of dividing the output amplifiers into two groups, on the right, and left sides, respectively, and another method of grouping odd-number-th output amplifiers and even-number-th output amplifiers, respectively, and in the latter case, there is the need for installing two lengths of wiring for transmitting the line output signals, respectively, across an output amplification unit, however, if a layout described as above is adopted, it is sufficient to install only one length of the wiring, on the right side and the left side of the output amplification unit, respectively, thereby enabling a wiring region to be reduced, so that in the case of the liquid crystal driver that is a semiconductor integrated circuit, a chip can be reduced in size.

Effects obtained from a representative one of embodiments disclosed in the present invention will be briefly described below.

That is, according to the present invention, a display driver device (liquid crystal driver, semiconductor integrated circuit for driving liquid crystals) having excellent display quality can be implemented.

Further, according to the applicant's invention, a display driver device (liquid crystal driver, semiconductor integrated circuit for driving liquid crystals) capable of executing drive for high-quality display while deterring occurrence of EMI can be implemented.

Still further, according to the applicant's invention, a display driver device (liquid crystal driver, semiconductor integrated circuit for driving liquid crystals) with ease of operation, capable of varying its function, according to a system in use.

Yet further, a display driver device (liquid crystal driver, semiconductor integrated circuit for driving liquid crystals) capable of executing drive for high-quality display while checking an increase in chip size.

DETAILED DESCRIPTION OF THE PREFERRED EMBODIMENTS

Preferred embodiments of the invention are described hereinafter with reference to the accompanying drawings.

Figure 1:
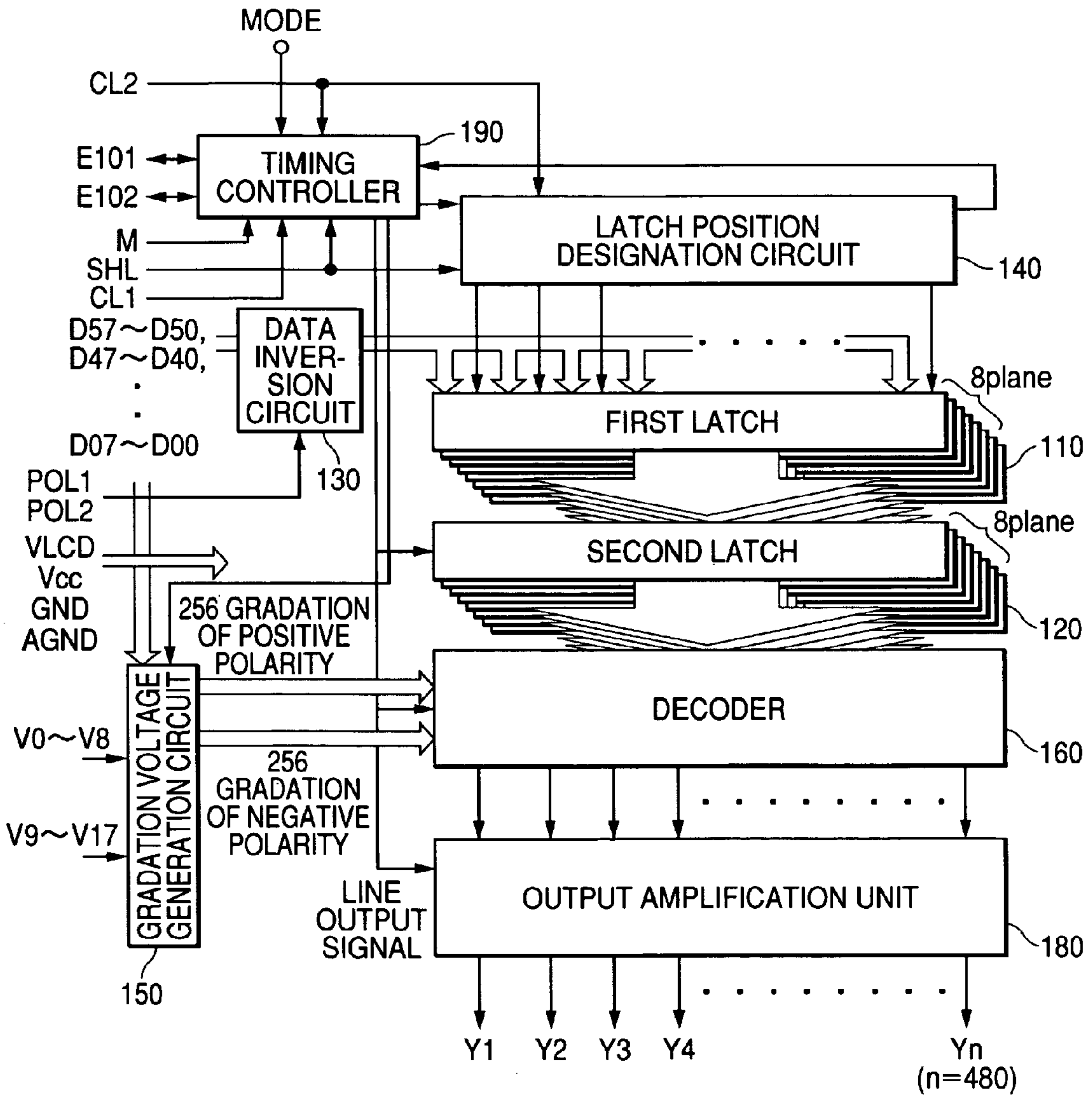
FIG. 1 is a block diagram broadly showing a configuration of a liquid crystal driver to which the invention is applied.

FIG. 1 broadly shows a configuration of a liquid crystal display driver to which the invention is applied. Respective circuit blocks shown in FIG. 1 are semiconductor integrated circuits each made up on one semiconductor chip such as a single crystal by the publicly known technology for semiconductor fabrication although those circuit blocks are not limited thereto. The liquid crystal display driver according to the present embodiment is a circuitry for outputting image signals Y1 to Yn impressed to signal lines, respectively, of a dot matrix-type color liquid-crystal panel in which a plurality of scanning lines (gate lines), and a plurality of signal lines (source lines) are disposed in a grid pattern and a pixel is provided at respective crossover points of both the lines.

With the invention, the embodiments are described hereinafter on the assumption that respective color data of red (R)/green (G)/blue (B), each in 8 bits, are grouped into pixel data of one pixel in 24 bits although not limited thereto.

Figure 2:
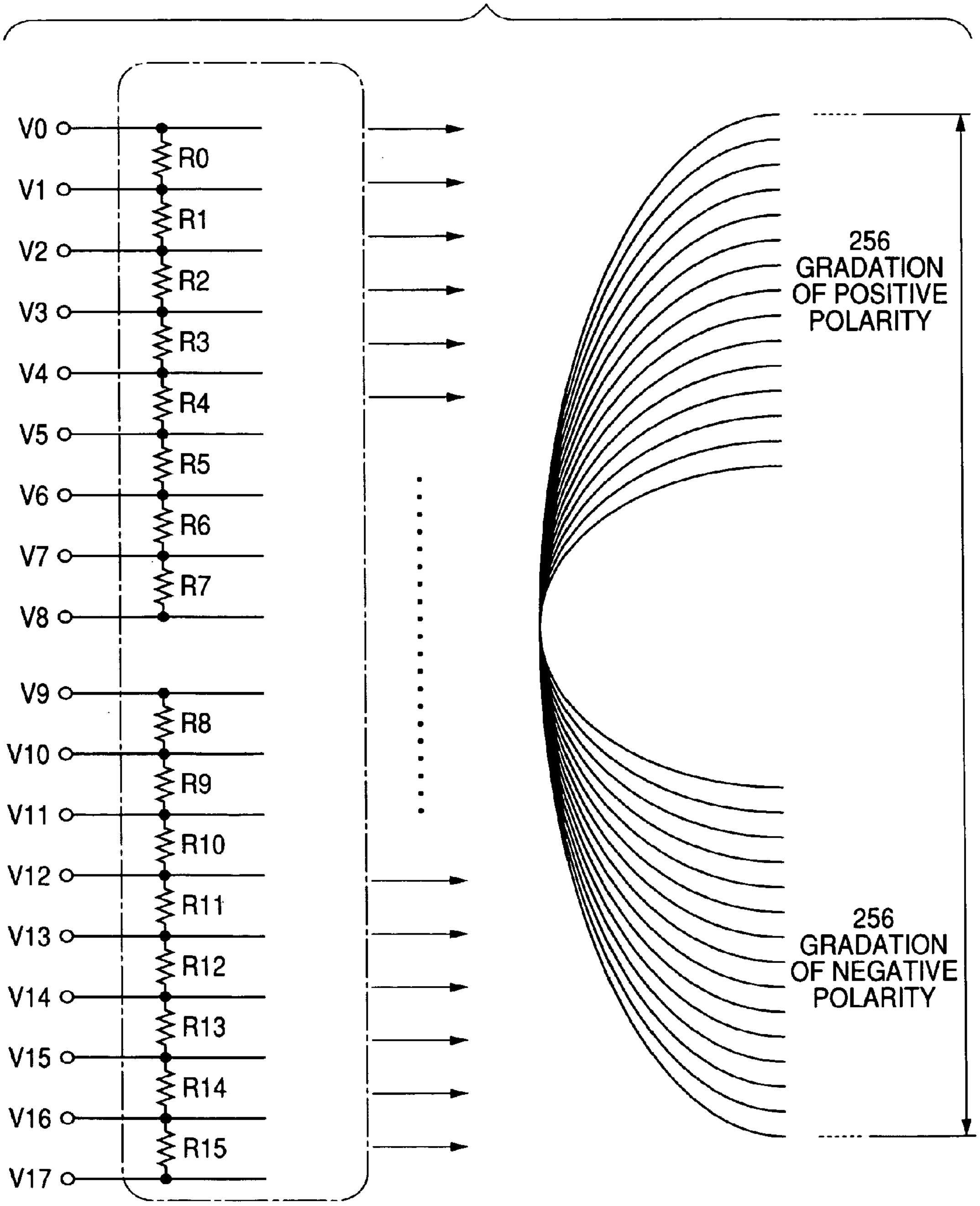
FIG. 2 is a conceptual view showing a configuration of a gradation voltage generation circuit.

The liquid crystal display driver according the present embodiment comprises a first latch 110 for sequentially capturing input image data in 8 bits (referring to one color data in 8 bits among three color data for R/G/B), a second latch 120 for batching the image data captured into the first latch 110 before transferring the same, a data inversion circuit 130 for inverting the input image data in response to input control signals POL 1, POL 2, a latch position designation circuit 140 for designating specific positions in the first latch 110, where the input image data are to be captured, a gradation voltage generation circuit 150 for generating 256 gradation voltages of positive polarity and negative polarity, respectively, by dividing gradation voltages supplied from outside, V0 to V8, V9 to V17 through, for example, ladder resistors R0 to R15 as shown in FIG. 2, a decoder (selector) 160 for selecting voltages corresponding to the image data held in the second latch 120 among the gradation voltages as generated, thereby converting digital signals into analog gradation voltages, an output amplification unit 180 for generating the image signals Y1 to Yn, corresponding to the analog gradation voltages, respectively, to be thereby outputted, a timing controller 190 for generating internal control signals for operating circuits inside the semiconductor chip on the basis of a clock signal and control signals, and in accordance with a predetermined order, and so forth.

The first latch 110, and the second latch 120 each are provided with 8 planes of data latch corresponding in number to the number of n (for example, n=480) signal lines. The reason for 8 planes to be provided is that in order to output, for example, the 256 gradation voltages from respective drive terminals of the source lines, there is the need for the image data in 8 bits being inputted per one terminal to be thereby held by the terminal.

With the liquid crystal display driver according the present embodiment, since the data inversion circuit 130 is provided, a user can effect such display as, for example, tone reversal without changing the input image data, thereby enabling occurrence of noises, and increase in current consumption, accompanying frequent changes in the input image data, to be controlled. This function is a function effective for a system for driving a liquid crystal monitor of a personal computer, and a note-type personal computer. Further, the liquid crystal display driver according to the present embodiment has a configuration in which image data D57 to D50 . . . D07 to D00, each for 6 pixels, grouping the respective color data in 8 bits, can be concurrently captured.

The timing controller 190 has a function for generating and outputting a timing control signal indicating operation timing for the first latch 110, second latch 120, latch position designation circuit 140, decoder 160, and output amplification unit 180, respectively, on the basis of an AC conversion signal M inputted from outside, for driving the liquid crystals by AC, a horizontal synchronizing signal CL1, a data transfer clock CL2, a shift-direction indicating signal SHL, and so forth. Further, the timing controller 190 supplies a control signal for decoding or designating which of the gradation voltage of positive polarity, and the gradation voltage of negative polarity, generated by the gradation voltage generation circuit 150, is to be selected by the decoder 160 according to a logic level of the AC conversion signal M. By so doing, the image signals Y1 to Yn, impressed to the respective signal lines of the liquid-crystal panel, are at AC voltages varying according to a period of the AC conversion signal M so that degradation in liquid crystals, due to a DC voltage impressed thereto, can be prevented.

Further, the timing controller 190 is provided with a function for determining whether or not capturing of the image data can be started depending on a state of a predetermined terminal EIO1, and outputting a signal indicating that the driver has outputted all the image signals Y1 to Yn for one line from a predetermined terminal EIO2 in the case of constructing a system for driving the liquid crystal panel having more signal lines than the output number (n lines) of the driver by connecting in series a plurality of the liquid crystal display drivers. More specifically, by causing the controller to input a transfer start signal to the terminal EIO1 of the liquid crystal display driver at the front and to connect the terminal EIO2 of the liquid crystal display driver in the front stage to the terminal EIO1 of the liquid crystal display driver in the next stage, the plurality of the liquid crystal display drivers can be put in a state for sequentially capturing the image data.

Furthermore, the liquid crystal display driver according to the present embodiment is provided with a mode setting terminal MODE enabling an operation mode to be set from outside although not limited thereto, and the timing controller 190 is configured so as to enable control such that a line output signal LOC1 described later on, and a line output signal LOC2 which is a delayed signal of the former are generated or not generated according to a state of the mode setting terminal MODE.

The line output signal LOC1 is a signal for notifying output timing of the image data to the output amplification unit 180, and is generated on the basis of the horizontal synchronizing signal (clock) CL1 delivered from outside. SHL is a signal for indicating the shift-direction of display data, controlling a write direction of display data written to the first latch 110 via the latch position designation circuit 140.

Figure 3:
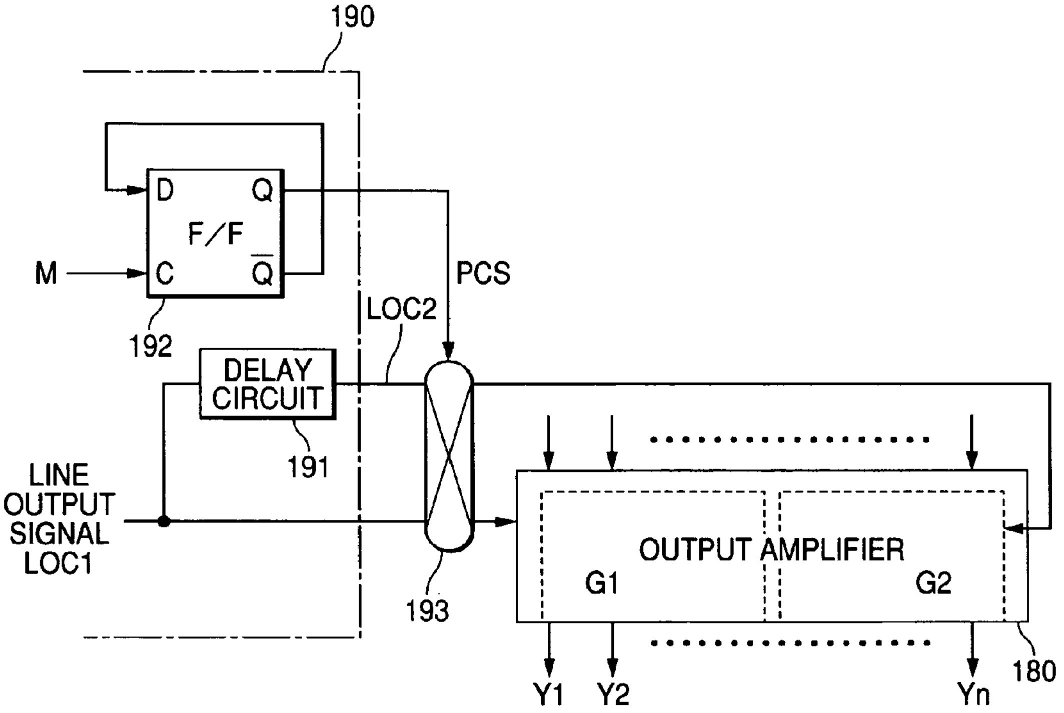
FIG. 3 is a block diagram with an output amplification unit, and a timing controller, partially cut away from the liquid crystal display driver shown in FIG. 1, showing configurations thereof, as a feature of a first embodiment of the invention.

FIG. 3 is a block diagram with the output amplification unit 180, and the timing controller 190, partially cut away from the liquid crystal display driver shown in FIG. 1, showing the configuration thereof, as a feature of a first embodiment of the invention.

As shown in FIG. 3, the present embodiment is provided with a delay circuit 191 for delaying the line output signal LOC1 by predetermined time Td, a signal path switchover circuit 193 capable of passing the delayed line signal LOC2, and the line output signal LOC1 before being delayed, causing both the signals to intersect each other, and switching over therebetween, and a signal generation circuit 192 comprising a D-type bistable trigger circuit FF1 for generating a switchover control signal PCS for executing switchover in the signal path switchover circuit 193, based on the AC conversion signal M. The optimum value of the delay time Td in the delay circuit 191 is on the order of 0.1 μs (microsecond), that is, a value equivalent to about 0.1 to several % of one horizontal period (15 μs) is appropriate.

Figure 4:
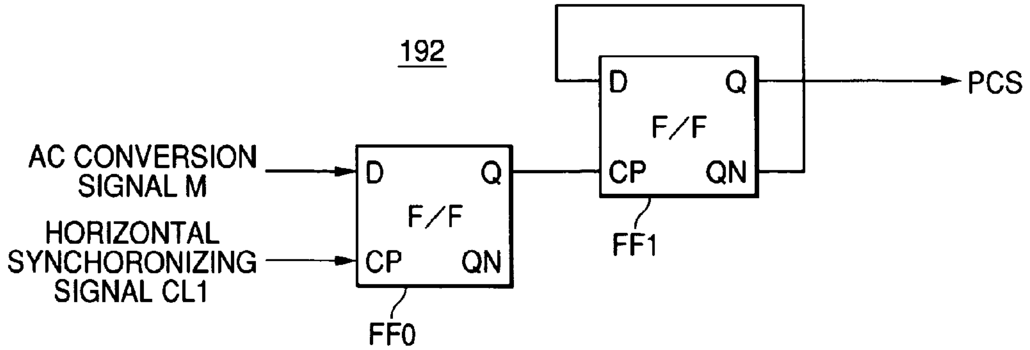
FIG. 4 is a block diagram broadly showing a configuration of a signal generation circuit for generating a switchover control signal PCS for executing switchover in a signal path switchover circuit.

The signal generation circuit 192 may be configured such that a D-type bistable trigger circuit FF0 for latching the AC conversion signal M is installed at a stage in front of the D-type bistable trigger circuit FF1 as shown in FIG. 4, the AC conversion signal M is latched at the falling edge of the horizontal synchronizing signal CL1, and an output of the D-type bistable trigger circuit FF0 is delivered to a clock terminal of the D-type bistable trigger circuit FF1 at a succeeding stage to trigger the operation thereof, thereby generating the switchover control signal PCS. With adoption of such a configuration, even if a pulse width of the AC conversion signal M becomes narrower, stable operation can be ensured.

Further, with the present embodiment, n pieces of output amplifiers (output circuits) of the output amplification unit 180 are divided into, for example, two groups G1, and G2, each consisting of half the total pieces. In this case, grouping of the n pieces of the output amplifiers of the output amplification unit 180 may be implemented by dividing them into respective right and left groups each having half the n pieces of the output amplifiers, that is, a group of the output amplifiers corresponding to the outputs Y1 to Yn/2, respectively, and a group of the output amplifiers corresponding to the outputs Yn/2+1 to Yn, respectively, or a group of the output amplifiers corresponding to the odd-numbered outputs Y1, Y3, . . . Yn−1, respectively, and a group of the output amplifiers corresponding to the even-numbered outputs Y2, Y4, . . . Yn, respectively. Otherwise, as shown FIG. 5 referred to later on, assuming that a pair of the output amplifiers corresponding the outputs Y1, Y2, respectively, is a first pair, a pair of the output amplifiers corresponding the outputs Y3, Y4, respectively, is a second pair, and so on, the grouping may be implemented by dividing the output amplifiers into odd-numbered pairs and even-numbered pairs, respectively.

The output amplifiers of the output amplification unit 180, receiving output timing given by the line output signal LOC1 or LOC2, are specifically configured so as to effect amplification operation by, for example, transmission gates, provided in a backward stage, being turned on/off by the line output signal LOC1 or LOC2, or by power sources of the respective amplifiers being turned on by the line output signal LOC1 or LOC2, serving as an activation signal, thereby outputting the image data.

Figure 5:
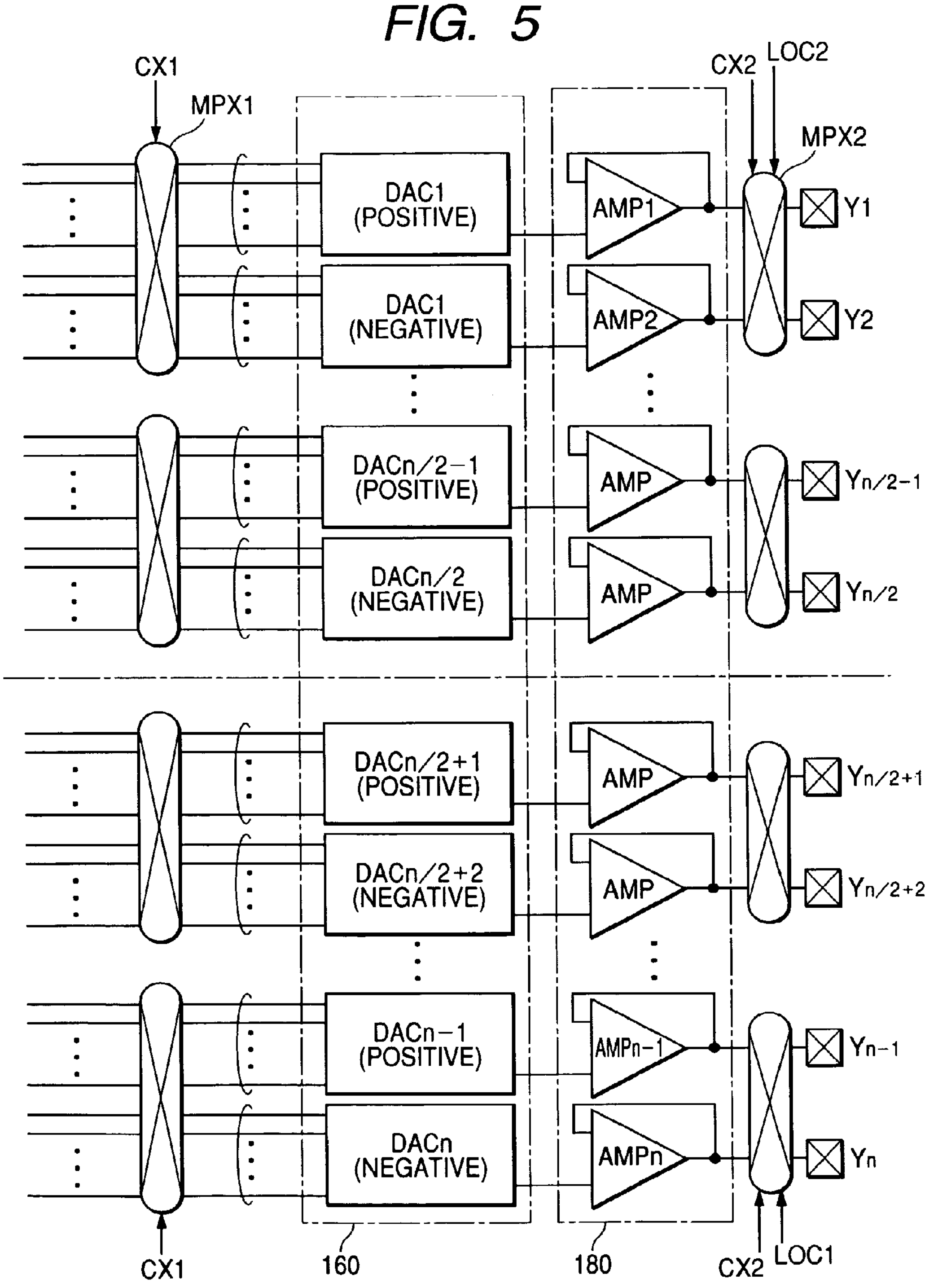
FIG. 5 is a block diagram showing configurations of a decoder, and the output amplification unit by way of example.

FIG. 5 shows an embodiment of the invention, wherein the transmission gates, provided in the backward stage behind the respective amplifiers of the output amplification unit 180, are rendered sharable with gates for inversion of polarity to effect AC drive.

In FIG. 5, use is made of low output impedance voltage followers as the respective amplifiers, AMP1 to AMPn, of the output amplification unit 180. Further, the decoder 160 for generating gradation voltages corresponding to the image data is provided with positive polarity voltage output DA converters DAC1, DAC3 . . . DACn−1, and negative polarity voltage output DA converters DAC2, DAC4 . . . DACn, alternately disposed. Based on the above, a multiplexer MPX1 for interchanging input data between the DA converters adjacent to each other is provided in a forward stage before the respective DA converters, and a multiplexer MPX2 for interchanging output signals is provided in a backward stage behind the respective amplifiers, AMP1 to AMPn.

The multiplexers, MPX1, and MPX2 are operated for switchover by control signals CX1, CX2, generated by the timing controller 190 on the basis of the AC conversion signal M, and the image data for a source line is alternately inputted to the positive polarity voltage output DACi, and the negative polarity voltage output DACi+1 by the multiplexer MPX1 to be thereby converted into an analog voltage before impressed to the source line via the multiplexer MPX2.

At this point in time, the multiplexers MPX1, and MPX2 are similarly operated. That is, signal paths are switched over such that when the respective multiplexers MPX1 pass the image data therethrough, the respective multiplexers MPX2 as well pass the image data therethrough while when the respective multiplexers MPX1 cause the image data to be intersected, the respective multiplexer MPX2 as well cause the image data to be intersected.

As a result, a positive polarity voltage and a negative polarity voltage are alternately inputted to respective pixel electrodes of the liquid crystal panel, and the liquid crystal panel is driven by AC, thereby preventing degradation of the liquid crystals. Further, with the present embodiment, while the respective multiplexers MPX2 are operated for switchover by the control signal CX2, the multiplexers MPX2 corresponding to the amplifiers AMP1 to AMPn/2 are given output timing by the line output signal LOC1, and the multiplexers MPX2 corresponding to the amplifiers AMPn/2+1 to AMPn are given output timing by the signal LOC2 which is the delayed signal of the signal LOC1.

Figure 6:
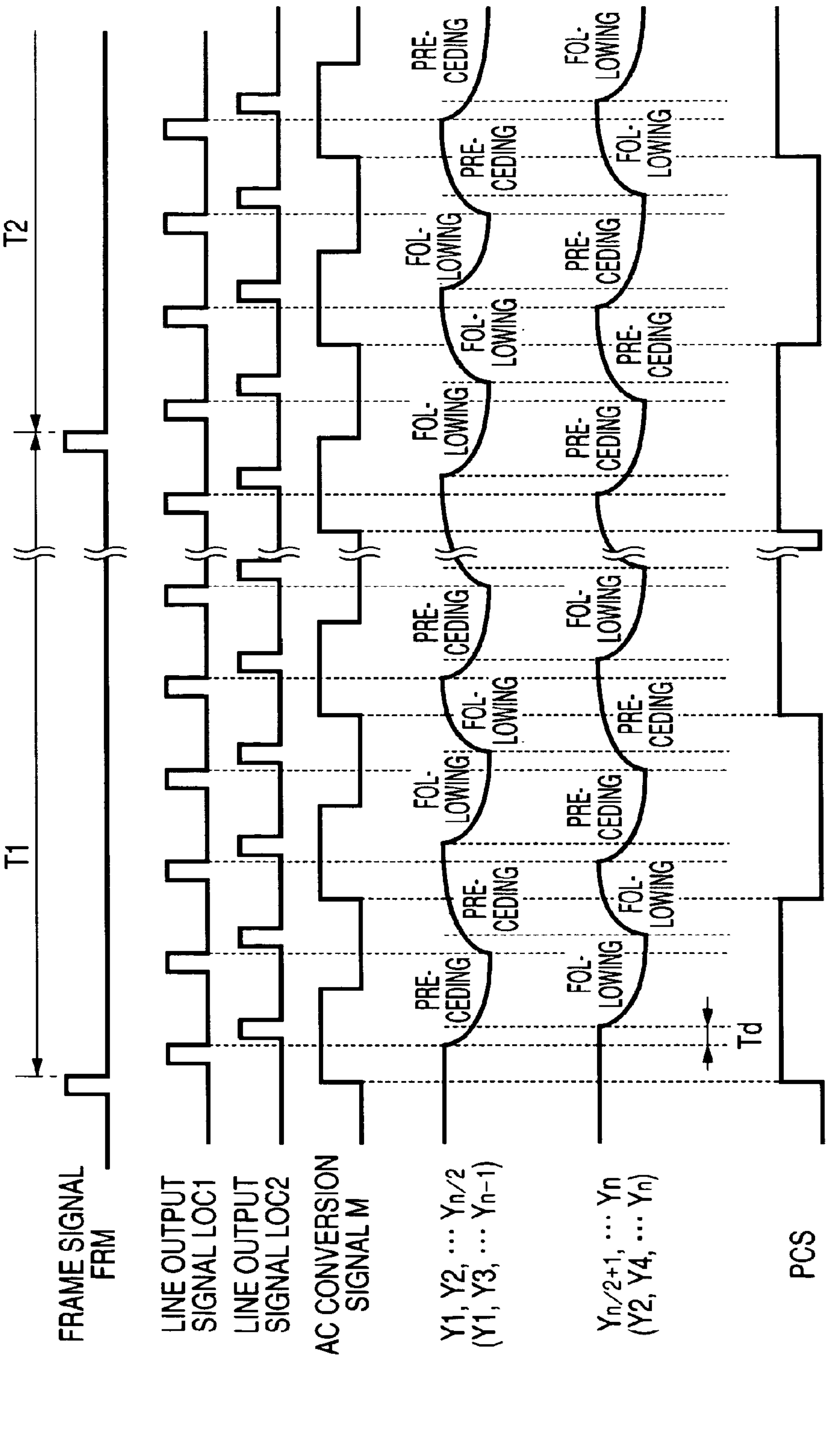
FIG. 6 is a timing chart showing respective timing of output image signals Y1 to Yn in the case of dot reversal drive, where dots are reversed for everyone line in the liquid crystal driver according to the first embodiment of the invention.

Next, timing of variation in the outputs (Y1 to Yn) from the output amplification unit 180, accompanying switchover between the line output signals LOC1, LOC2, by the signal path switchover circuit 193 according to the present embodiment, is described with reference to FIG. 6. In FIG. 6, there is shown the case where the period of the AC conversion signal M is twice as long as a period of the line output signals, that is, timing in the case of dot reversal drive, where dots are reversed for every one line.

As shown in FIG. 6, with the liquid crystal display driver according the present embodiment, because the switchover control signal PCS of the signal path switchover circuit 193 changes between High-level and Low-level for every period of the AC conversion signal M, when PCS is at High-level, the output amplifiers corresponding to the outputs Y1 to Yn/2, respectively, start output in sync with the falling edge of the line output signal LOC1, and at timing behind the former by time Td, the output amplifiers corresponding to the outputs Yn/2+1 to Yn, respectively, start output in sync with the falling edge of the line output signal LOC2. Further, when PCS is at Low-level, the output amplifiers corresponding to the outputs Yn/2+1 to Yn, respectively, start output in sync with the falling edge of the line output signal LOC2, and at timing behind the former by time Td, the output amplifiers corresponding to the outputs Y1 to Yn/2, respectively, start output in sync with the falling edge of the line output signal LOC1.

Then, in the next period, contrary to the above, the output amplifiers corresponding to the outputs Yn/2+1 to Yn, respectively, first start output in sync with the falling edge of the line output signal LOC2, and at timing behind the former by time Td, the output amplifiers corresponding to the outputs Y1 to Yn/2, respectively, start output in sync with the falling edge of the line output signal LOC1. Subsequently, the output amplifiers corresponding to the outputs Y1 to Yn/2, respectively, start output in sync with the falling edge of the line output signal LOC1, and at timing behind the former by time Td, the output amplifiers corresponding to the outputs Yn/2+1 to Yn, respectively, start output in sync with the falling edge of the line output signal LOC2.

Thus, by executing output control with time difference wherein timing of half output of the total output is slightly delayed from timing of the remaining half output, the peak of current flowing through the source lines of the liquid crystal panel can be lowered, and by switching over the group to be delayed by the period of the AC conversion signal M, charge time of the respective pixel electrodes, by either of the output signals, will become identical over a long time period if image data are the same, so that an effective voltage can be stabilized in comparison with the case of output control with time difference, where the group to be delayed is unchanged.

With the present embodiment described as above, the switchover control signal PCS of the signal path switchover circuit 193 is generated based on the AC conversion signal M, however, a frame synchronization signal (FRM), in place of the AC conversion signal M, may be delivered to the signal generation circuit 192 (the bistable trigger circuit) to thereby generate the switchover control signal PCS of the signal path switchover circuit 193 on the basis of the frame synchronization signal (FRM).

Figure 7:
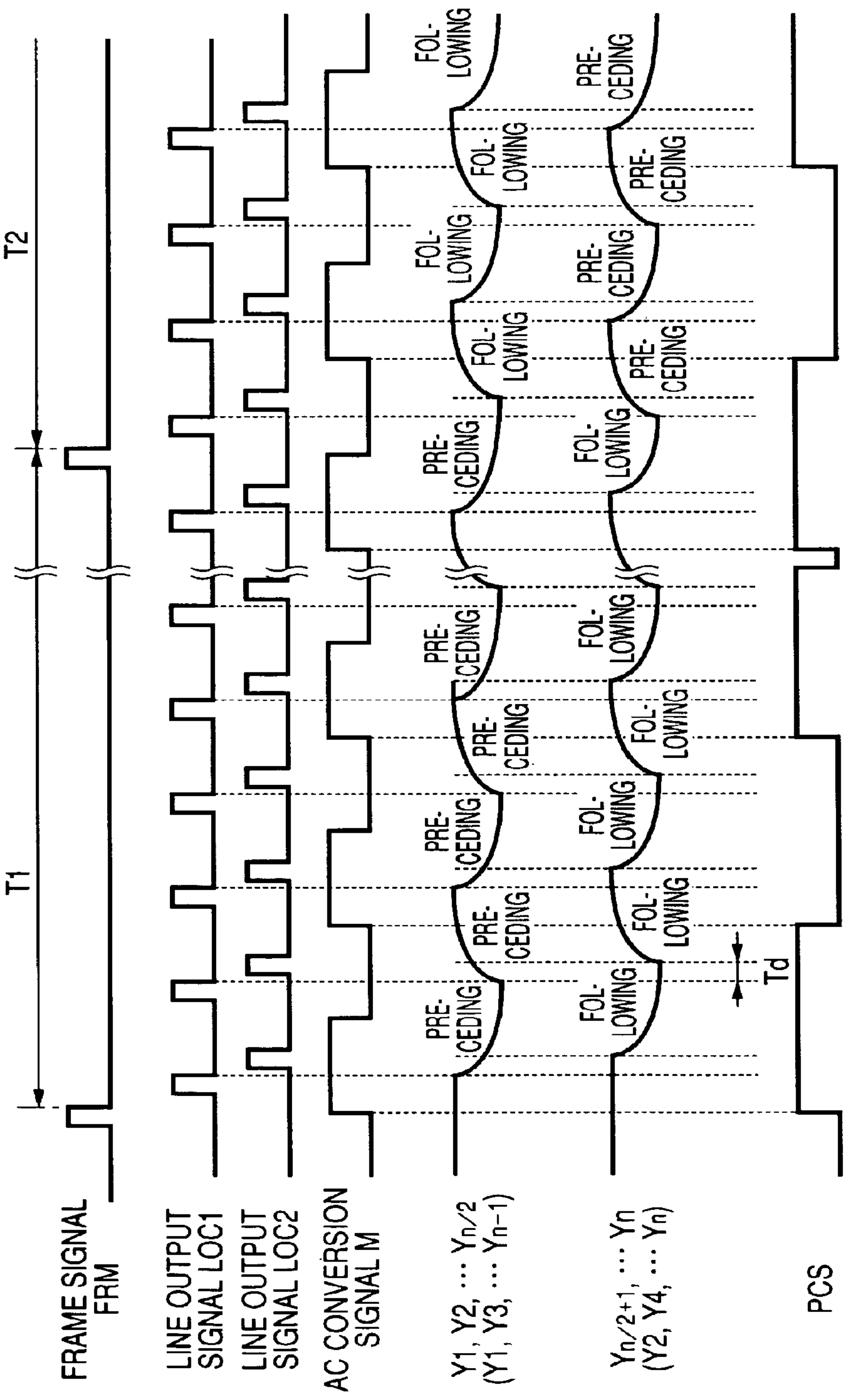
FIG. 7 is a timing chart showing respective timing of output image signals Y1 to Yn in the case where the switchover control signal PCS of the signal path switchover circuit is generated based on a frame synchronization signal (FRM) in the liquid crystal driver according the present embodiment.

FIG. 7 shows timing of variation in the outputs (Y1 to Yn) from the output amplification unit 180 in such a case. As is evident from FIG. 7, with the liquid crystal display driver according to the present embodiment, the switchover control signal PCS of the signal path switchover circuit 193 changes between High-level and Low-level for every period of the frame synchronization signal (FRM), so that during a first period T1 of the frame synchronization signal (FRM), the output amplifiers corresponding to the outputs Y1 to Yn/2, respectively, start output in sync with the falling edge of the line output signal LOC1, and at timing behind the former by time Td, the output amplifiers corresponding to the outputs Yn/2+1 to Yn, respectively, start output in sync with the falling edge of the line output signal LOC2.

Then, during a second period T2 of the frame synchronization signal (FRM), contrary to the above, the output amplifiers corresponding to the outputs Yn/2+1 to Yn, respectively, first start output in sync with the falling edge of the line output signal LOC1, and at timing behind the former by time Td, the output amplifiers corresponding to the outputs Y1 to Yn/2, respectively, start output in sync with the falling edge of the line output signal LOC2. In FIG. 7 as well, there is shown the case where the period of the AC conversion signal M is twice as long as the period of the line output signals, that is, timing in the case of reversal drive, where dots are reversed for every line.

In this case, since the switchover control signal PCS of the signal path switchover circuit 193 is generated based on the frame synchronization signal (FRM) as described, the effective voltage of the respective pixels, for the same image data, will become identical, thereby enhancing display picture quality, however, the AC conversion signal M is shorter in period than the frame synchronization signal (FRM), so that in the case of generating the switchover control signal PCS on the basis of the AC conversion signal M, as with the first embodiment, high picture quality is easier to obtain. Furthermore, the liquid crystal display driver available in the market today is generally one receiving the AC conversion signal M from outside while as for the frame synchronization signal (FRM), there are one receiving it from outside, and one not receiving it from outside, so that the liquid crystal display driver receiving the AC conversion signal M from outside is advantageous in that the number of input signals, and the number of external terminals can be reduced.

As above, there has been described the case where the output control with time difference is executed by dividing the n pieces of the output amplifiers of the output amplification unit 180 into the right and left half groups, respectively, that is, the group of the output amplifiers corresponding to the outputs Y1 to Yn/2, respectively, and the group of the output amplifiers corresponding to the outputs Yn/2+1 to Yn, respectively, however, the output control with time difference may be executed by dividing the n pieces of the output amplifiers into the group of the output amplifiers corresponding to the odd-numbered outputs Y1, Y3, . . . Yn−1, respectively, and the group of the output amplifiers corresponding to the even-numbered outputs Y2, Y4, . . . Yn, respectively. Output timing in such a case is the same as described with reference to FIGS. 6 and 7, and can be visualized by substituting Y1, Y3, . . . Yn−1 with Y1 to Yn/2, and Y2, Y4, . . . Yn with Yn/2+1 to Yn.

Further, with the present embodiment, the signal generation circuit 192 and the delay circuit 191 are installed inside the timing controller 190, and the signal path switchover circuit 193 is installed on a side of the timing controller 190, adjacent to the output amplification unit 180, however, the delay circuit 191 as well may be installed on the side of the timing controller 190, adjacent to the output amplification unit 180 although the invention has no particular limitation thereto.

Further, the delay circuit 191 can be configured so as to comprise delay inverter series DLY, a bypass path BPS for bypassing DLY, and a switch SW for changeover, thereby enabling the line output signal LOC1 to be delayed or not to be delayed by changing over the switch SW according to, for example, the mode signal MODE. Then, the timing controller 190 may be configured such that in a state where the line output signal LOC1 is not to be delayed due to the changeover of the switch SW, the switchover control signal PCS is fixed to High-level, or Low-level by resetting the bistable trigger circuits 192, thereby stopping changeover of the signal path switchover circuit 193.

Figure 8:
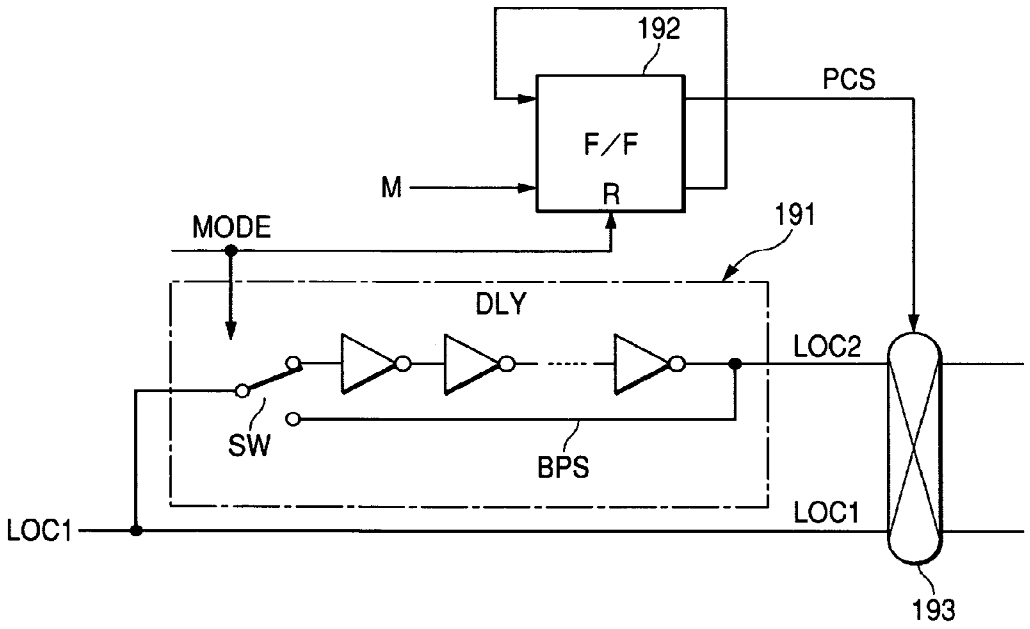
FIG. 8 is a block diagram showing a configuration of a delay circuit for delaying the line output signals by way of example.

With a display system wherein sufficient charge time for pixel electrodes cannot be provided because, for example, a line output period, that is, a shift period of a common line is short, it is possible by not executing delay of the line output signal LOC1 to avoid lowering of the effective voltage, due to the output control with time difference between the two groups, on the right, and left sides, respectively, according to the present embodiment. With reference to a configuration shown in FIG. 8, by installing a plurality of delay inverter series, each differing in the number of stages, that is, in delay time, and setting the delay times in a register, and so forth, it is also possible to establish a configuration capable of adjusting delay time according to a liquid crystal panel, and a system, in use.

Figure 9:
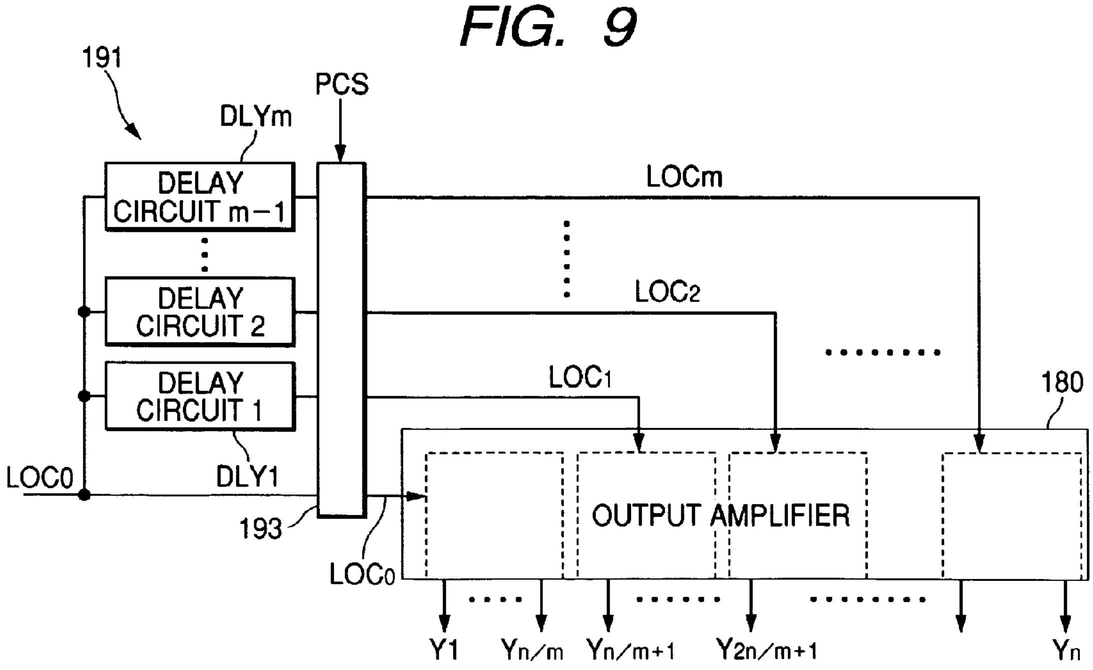
FIG. 9 is a block diagram showing a configuration of a second embodiment of the invention.

FIG. 9 shows a second embodiment of the invention. With the present embodiment, a plurality of delay circuits DLY1, DLY2 . . . DLYm, for delaying a line output signal LOC0 differing in delay time from each other, are provided to generate the line output signals LOC0, LOC1 to LOCm, each differing in timing, while the n pieces of the output amplifiers of the output amplification unit 180 are divided into (m+1) pieces of groups, and the line output signals LOC0 to LOCm are changed over in the signal path switchover circuit 193 for every suitable period (for example, a period m times the period of the AC conversion signal M) before being sequentially fed into the output amplifiers of the respective groups, thereby executing operation at different timings. The present embodiment is advantageous in that the peak of current flowing through the source lines of the liquid crystal panel can be further lowered.

In FIG. 9, there is described the embodiment wherein the n pieces of the output amplifiers of the output amplification unit 180 are divided into (m+1) pieces of groups, and the respective groups are controlled by (m+1) pieces of the line output signals LOC0 to LOCm, each differing in timing, however, the invention is not limited thereto. Alternatively, not less than m pieces of the delay circuits may be provided, and respective line output signals therefrom may be changed over by the signal path switchover circuit 193 at a suitable timing to be thereby fed to the m or more pieces of groups as divided from the n pieces of the output amplifiers of the output amplification unit 180, thereby controlling the m or more pieces of groups.

Figure 10:
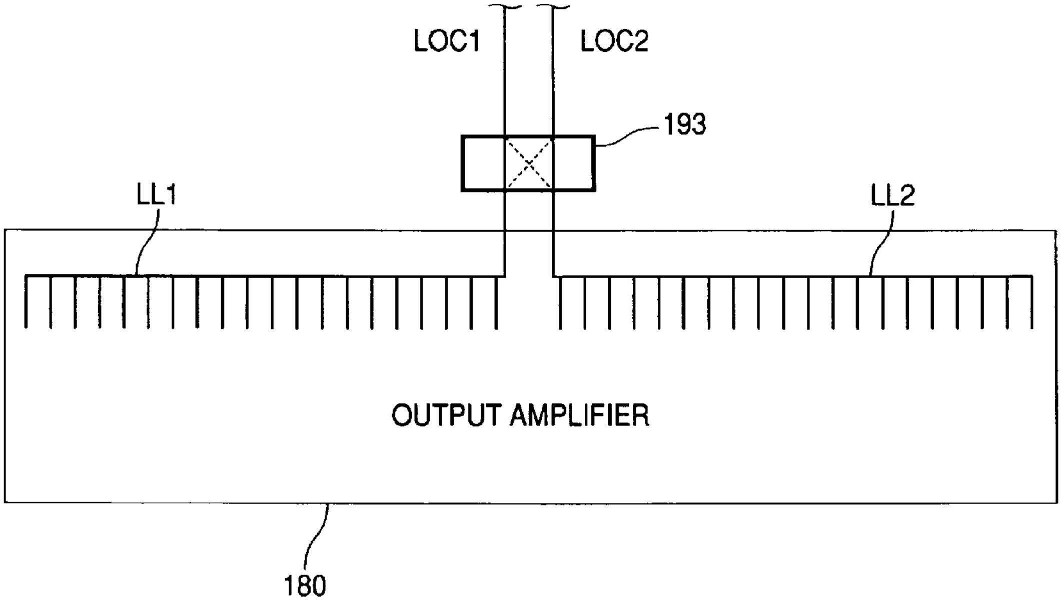
FIG. 10 a schematic view showing a layout of a third embodiment of the invention.

FIG. 10 shows a third embodiment of the invention. The present embodiment has a configuration in which a signal path switchover circuit 193 is disposed substantially at the center of, and adjacent to the output amplification unit 180 of the first embodiment shown in FIG. 3, wherein the n pieces of the output amplifiers of the output amplification unit 180 are divided into the two groups, on the right, and left sides, respectively, and the output control with time difference is executed by either the line output signal LOC1 or LOC2 of the two line output signals, and wiring LL1, LL2, extended along the direction of the lines of the output amplifiers, is provided on respective sides of the signal path switchover circuit 193, thereby effecting output operation with time difference while feeding the line output signal LOC1 or LOC2 to the respective output amplifiers for periodic changeover.

If the odd-number-th output amplifiers and the even-number-th output amplifiers are grouped, respectively, there is the need for installing two lengths of the wiring LL1, LL2, respectively, for transmitting the line output signal LOC1 and LOC2, across the output amplification unit 180, however, if a layout shown in FIG. 10 is adopted, it is sufficient to install only one length of the wiring LL1, LL2, respectively, on the right side and the left side of the output amplification unit 180, respectively, thereby gaining an advantage of reducing a wiring region.

Figure 11:
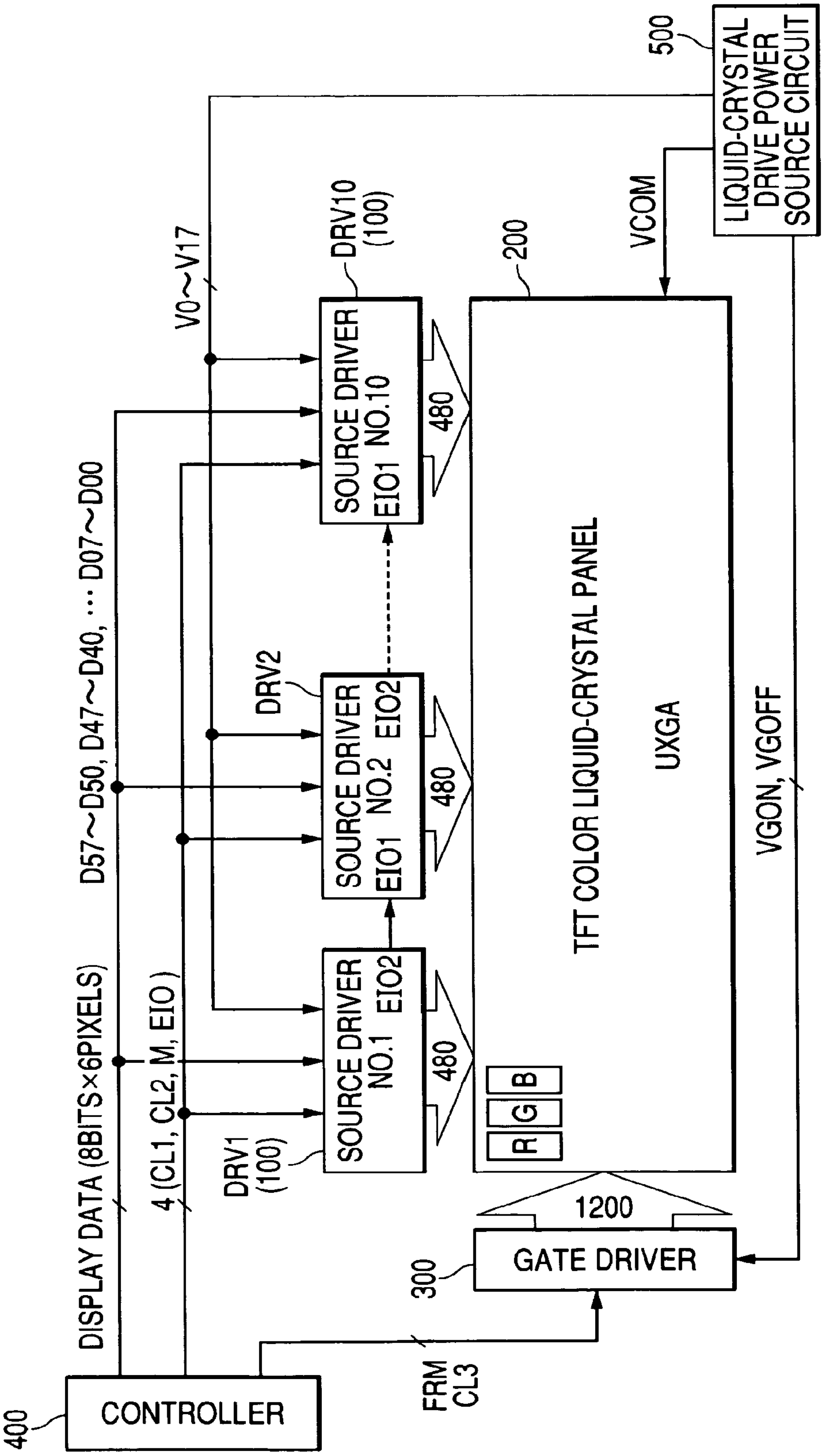
FIG. 11 is a block diagram showing a configuration of a liquid crystal display system using a plurality of the liquid crystal drivers according to the present embodiment by way of example.

FIG. 11 is a block diagram of a system for driving a color liquid-crystal panel 200 of 1600×1200 dots by use of a plurality of the liquid crystal display drivers 100 according to the present embodiment. There are disposed 10 pieces of source drivers DRV1 to DRV10 in the direction of lines of the color liquid-crystal panel 200, and a terminal EIO2 of each of the source drivers in respective preceding stages is electrically connected to respective terminals EIO1 of the source drivers DRV2 to DRV10 among the source drivers DRV1 to DRV10, thereby connecting DRV1 to DRV10 in series.

A data capture-enable signal EIO from a liquid crystal display controller 400 is delivered to a terminal EIO1 of the source driver DRV1 at the forefront, and upon completion of data capturing by the source driver DRV1 at the forefront, the terminal EIO2 undergoes a change to High-level, whereupon the signal EIO is delivered as a data capture-enable signal to the terminal EIO1 of the source driver DRV2 in the following stage, thereby starting data capturing. As a result, by connecting the source drivers in respective succeeding stages to each other so as to receive the signal at the respective terminals EIO1 thereof, the liquid crystal display controller can transmit continuous image data without sending out individual start signals to the respective drivers in a display system using a plurality of the source drivers. Consequently, a burden imposed on a designer of the display system can be lessened.

The drive system, shown in FIG. 11, comprises the source drivers DRV1 to DRV10, as described above, a gate driver (scanning line drive circuit) 300 for sequentially turning common lines (referred to as gate lines in a TFT panel) of the color liquid-crystal panel 200 to select levels, the liquid crystal display controller 400 for controlling the system as a whole, and a liquid crystal power supply circuit 500 for generating a liquid crystal drive voltage. The liquid crystal display controller 400 generates the frame synchronization signal FRM as a control signal for the gate driver 300, a clock CL3 for giving shift timing, the image data D57 to D50 . . . D07 to D00, to be supplied to the source drivers DRV1 to DRV10, respectively, the enable signal EIO for controlling the source drivers, the operation clocks CL1, CL2, and the AC conversion signal M.

The liquid crystal power supply circuit 500 generates the gradation voltages V0 to V17 (refer to FIGS. 1 and 2) at 18 steps, as sources of the gradation voltages supplied to the source drivers DRV1 to DRV10, respectively, a voltage VCOM impressed, as a liquid-crystal central potential, to opposite electrodes of the color liquid-crystal panel 200, a voltage VGON, supplied to the gate driver 300, serving as the select level of the gate line, and a voltage VGOFF, supplied to the gate driver 300, serving as unselect level of the gate line.

Figure 12A:
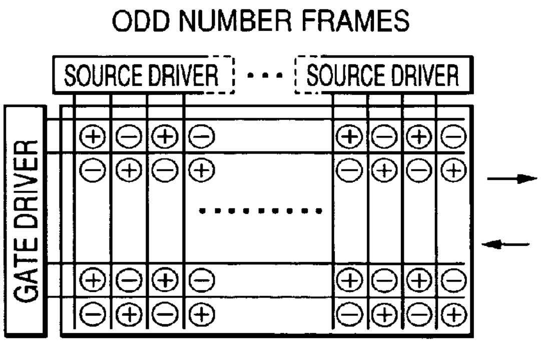
FIG. 12 is an illustrative view showing an example of driving the liquid crystal panel by AC in a liquid crystal display system to which the present invention is applicable.
Figure 12B:
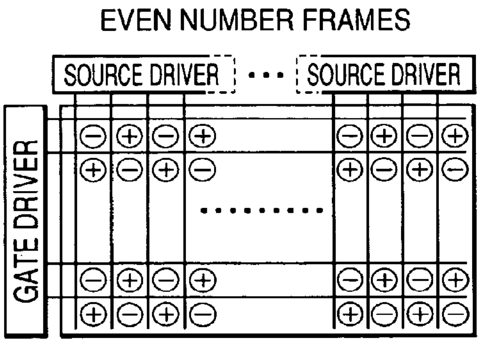
Figure 13A:
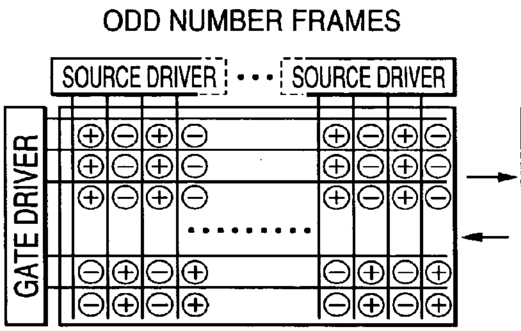
FIG. 13 is an illustrative view showing another example of driving the liquid crystal panel by AC in a liquid crystal display system to which the present invention is applicable.
Figure 13B:
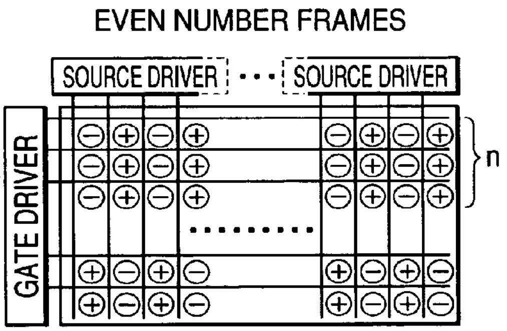
Figure 14A:
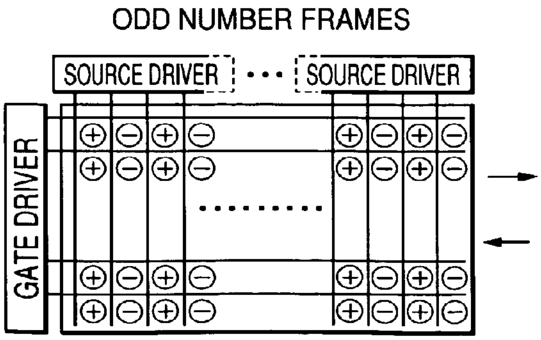
FIG. 14 is an illustrative view showing still another example of driving the liquid crystal panel by AC in a liquid crystal display system to which the present invention is applicable.
Figure 14B:
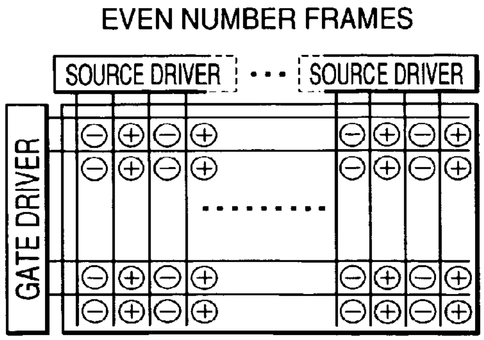
Figure 15:
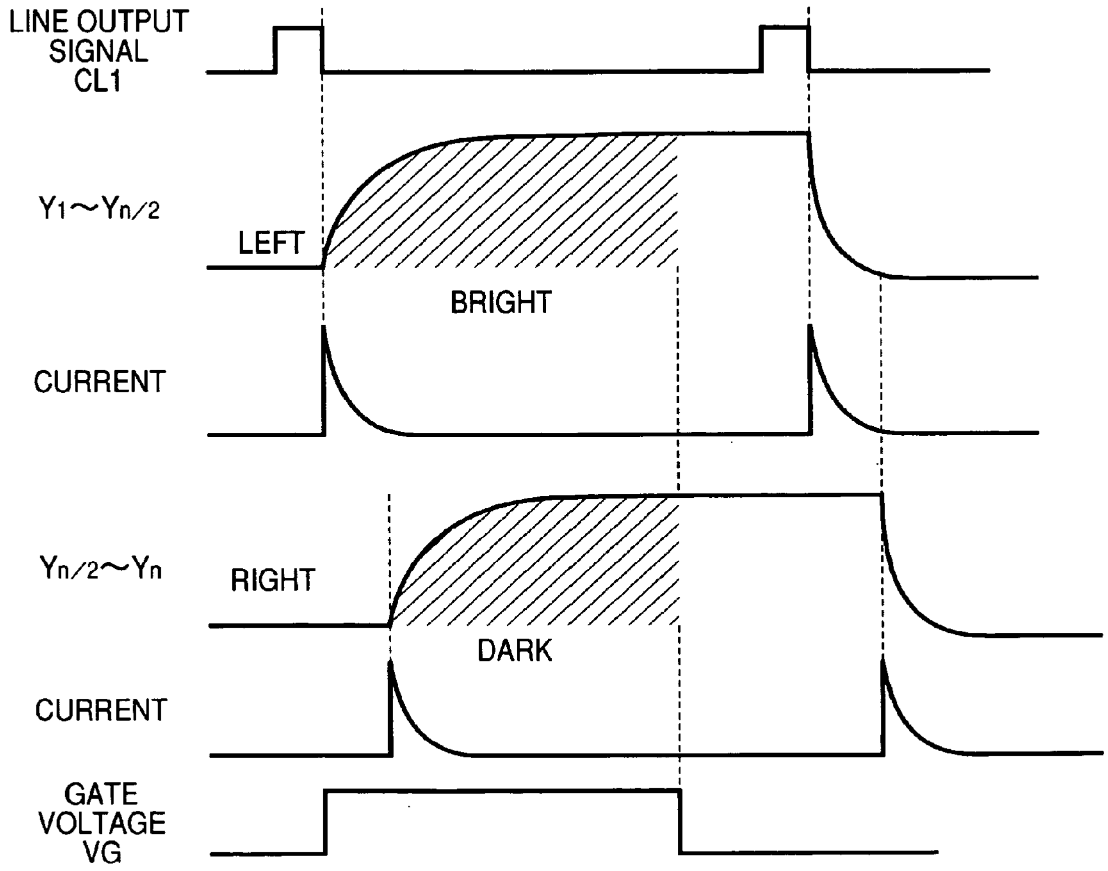
FIG. 15 is a timing chart showing respective timing of output image signals Y1 to Yn, due to control with time difference as reviewed prior to development of the present invention.

In FIGS. 12 to 14, there are shown examples of driving the liquid crystal panel by AC, respectively. In those figures, symbols (+), (−) express the polarities of respective dots (pixels), and (A), (B) show how the respective dots undergo inversion, respectively. As is evident from those figures, with the examples of driving the liquid crystal panel by AC, in FIGS. 12 to 14, respectively, a method of differentiating output timing by dividing the liquid crystal panel into a group of odd-numbered column lines (odd-numbered source lines), and a group of even-numbered column lines (even-numbered source lines) is adopted instead of a method of dividing the liquid crystal panel into the right and left groups, respectively.

FIGS. 12 to 14 show that the case of adopting the method of differentiating output timing by dividing the liquid crystal panel into the group of odd-numbered column lines (odd-numbered source lines), and the group of even-numbered column lines (even-numbered source lines) includes various cases where a method of polarity reversal in the directions of the respective scanning lines differs. Those drive methods are decided upon by the control signal for designating which of the gradation voltage of positive polarity, and the gradation voltage of negative polarity, is to be selected for output according to the AC conversion signal M, fed to the decoder 160 from the timing controller 190.

An AC drive method, shown in FIG. 12 among those in FIGS. 12 to 14, respectively, is a drive method whereby the respective dots adjacent to each other, up and down as well as the right and the left, are reversed in polarity from each other, and the respective dots are reversed in polarity by the frame, that is, the dots in respective odd-numbered frames are reversed in polarity from those in respective even-numbered frames. An AC drive method, shown in FIG. 13, is a drive method whereby the respective dots are reversed in polarity for every m scanning lines, that is, m pieces of the dots in the same column line are identical in polarity, and are reversed in polarity from those in respective adjacent column lines. An AC drive method, shown in FIG. 14, is a drive method whereby the respective dots are reversed in polarity by the frame, that is, all the dots in the same column line are identical in polarity, and are reversed in polarity from those in respective adjacent column lines.

With the method of dividing the liquid crystal panel into the right and left groups, respectively, and staggering respective output timings, similar AC drive methods corresponding to those shown in FIGS. 12 to 14, respectively, are conceivable. Further, with a system using a plurality of source drivers, it is possible to adopt a method whereby respective dots are reversed in polarity for every adjacent driver, and all the drivers are divided into two groups, thereby executing output control with time difference on a group-to-group basis.

Having specifically described the invention developed by the inventor et al, with reference to the embodiments, as above, it is obvious that the invention is not limited thereto, and various changes and modifications may be made in the invention without departing from the spirit and scope thereof. For example, with the embodiments described in the foregoing, there has been described the case where the image data is in 8 bits, and the gradation voltage has 256 steps of positive polarity, and negative polarity, respectively, however, the invention is not limited thereto, and is applicable to the case where the image data is in 9 bits, and the gradation voltage has 512 steps, and to the case where the image data is in 10 bits, and the gradation voltage has 1024 steps. Further, with the embodiments described, one unit of the liquid crystal display driver is provided with 480 pieces of the output amplifiers, however, the same may be provided with 420 pieces of the output amplifiers instead. Still further, with the embodiments described, the voltage followers are used as the respective output amplifiers, however, use may be made of differential amplifiers instead. Yet further, with the embodiments described, there has been described the case of concurrently capturing the image data for 6 pixels (corresponding to one line), however, the invention is not limited thereto, and there may be the case of concurrently capturing image data for 3 pixels, 4 pixels, and so forth, as corresponding to one line. Furthermore, a level of an image data signal inputted from outside may be TTL level, LVDS (Low Voltage Differential Signaling) level, or mini-LVDS level.

Further, a format of the output amplifiers is not limited to a pair mode of the output amplifiers, as shown in FIG. 5, but the invention is applicable to a mode (bidirectional amplifier mode) in which the multiplexer MPX2 is not provided in FIG. 5.

Still further, with the embodiments described, there are provided the terminals EIO2 for outputting the signal EIO for indicating completion of the data capturing upon completion of the data capturing, and in the case of constituting the system by use of the plurality of driver ICs, the signal from the respective terminals EIO2 is delivered, as the data capture-enable signal EIO, to the driver IC in the following stage, however, a configuration can be adopted wherein the terminals EIO2 for outputting the signal EIO are omitted, and the data capture-enable signal EIO is sequentially delivered to all the driver ICs from the liquid crystal display controller 400.

Furthermore, with the embodiments described, a drive method for the color liquid-crystal panel has been described, however, the invention is applicable to a drive method for an organic EL display panel.

INDUSTRIAL APPLICABILITY

In the foregoing description, there has been described the case where the invention developed by the inventor et al, is applied mainly to the liquid crystal display driver for the TFT color liquid-crystal panel, that is, an applicable field as the background of the invention, however, it is to be pointed out that the invention is not limited thereto, and can be applied to not only a liquid crystal display driver for a color liquid-crystal panel other than the TFT color liquid-crystal panel, but also a liquid crystal display driver for driving a black-and-white liquid crystal display panel. Further, the liquid crystal display driver according to the invention is naturally applicable to the case of driving a liquid crystal display for television, and is also applicable to liquid crystal display drivers for driving liquid crystal monitors for personal computers and notebook-type computers, respectively.

What is claimed is:

1. A display system comprising:

a display panel including source lines, gate lines and pixels provided between the source lines and the gate lines;

a gate driver coupled to the gate lines; and a source driver coupled to the source lines, the source driver comprising:

a plurality of output circuits coupled to the source lines of the display panel and including a first group of output circuits and a second group of output circuits outputting gradation voltages to respective source lines of the display panel; and a timing circuit coupled to the first and second groups of output circuits to control output timings of the first and second groups of output circuits;

wherein, in a first frame, the timing circuit controls the first and second groups according to a first output timing, and in a second, consecutive frame, the timing circuit controls the first and second groups according to a second output timing;

in the first output timing, the second group of output circuits output voltages after the first group of output circuits output voltages in a period for outputting voltages to respective source lines of the display panel, and in the second output timing, the first group of output circuits output voltages after the second group of output circuits output voltages in a period for outputting voltages to respective source lines of the display panel.

2. A display system according to claim 1, wherein the first group of output circuits include odd-number-position output circuits among the plurality of output circuits and the second group of output circuits include even-number-position output circuits among the plurality of output circuits.

3. A display system according to claim 1, wherein the display panel is a liquid crystal display panel, and wherein the timing circuit controls the first output timing and the second output timing according to an AC conversion signal.

4. A display system according to claim 1, wherein the timing circuit controls the first output timing and the second output timing according to a signal indicating display time for one frame of the display panel.

5. A display system comprising:

a display panel including source lines, gate lines and pixels provided between the source lines and the gate lines;

a gate driver coupled to the gate lines; and a plurality of source drivers, coupled to the source lines, to provide source signals to the source lines of the display panel, each source driver comprising:

a timing controller, coupled to receive a horizontal synchronizing signal, to provide a first line output clock signal based on the horizontal synchronizing signal and a second line output clock signal which is delayed with respect to the first line output clock signal;

a switching circuit coupled to receive a timing signal which is periodically changed between a first level and a second level and having:

a first input coupled to receive said first line output clock signal, a second input coupled to receive said second line output clock signal, a first output which is coupled to the first input when the timing signal is in the first level and which is coupled to the second input when the timing signal is in the second level, and a second output which is coupled to the first input when the timing signal is in the second level and which is coupled to the second input when the timing signal is in the first level;

first group of output circuits which are coupled to the first output of the switching circuit and which are coupled to first source lines in the source lines of the display panel to provide first source signals to the first source lines in the source lines of the display panel according to the first line output clock signal or the second line output clock signal; and second group of output circuits which are coupled to the second output of the switching circuit and which are coupled to second source lines in the source lines of the display panel, which are different from the first source lines, to provide second source signals to the second source lines according to the first line output clock signal or the second line output clock signal, wherein, in a first frame, the first line output clock signal is provided and the second group of output circuits output the second source signals after the first group of output circuits output the first source signals, and in a second, consecutive frame, the second line output clock signal is provided and the first group of output circuits output the first source signals after the second group of output circuits output the second source signals.

6. A display system according to claim 5, wherein the timing signal is based on an AC conversion signal.

7. A display system according to claim 5, wherein the timing signal is based on a frame signal.

* * * * *